Jan. 9, 1940.                A. BOULTON                  2,186,540
                    ANKLE JOINT FOR ARTIFICIAL LIMBS
                          Filed Feb. 26, 1938
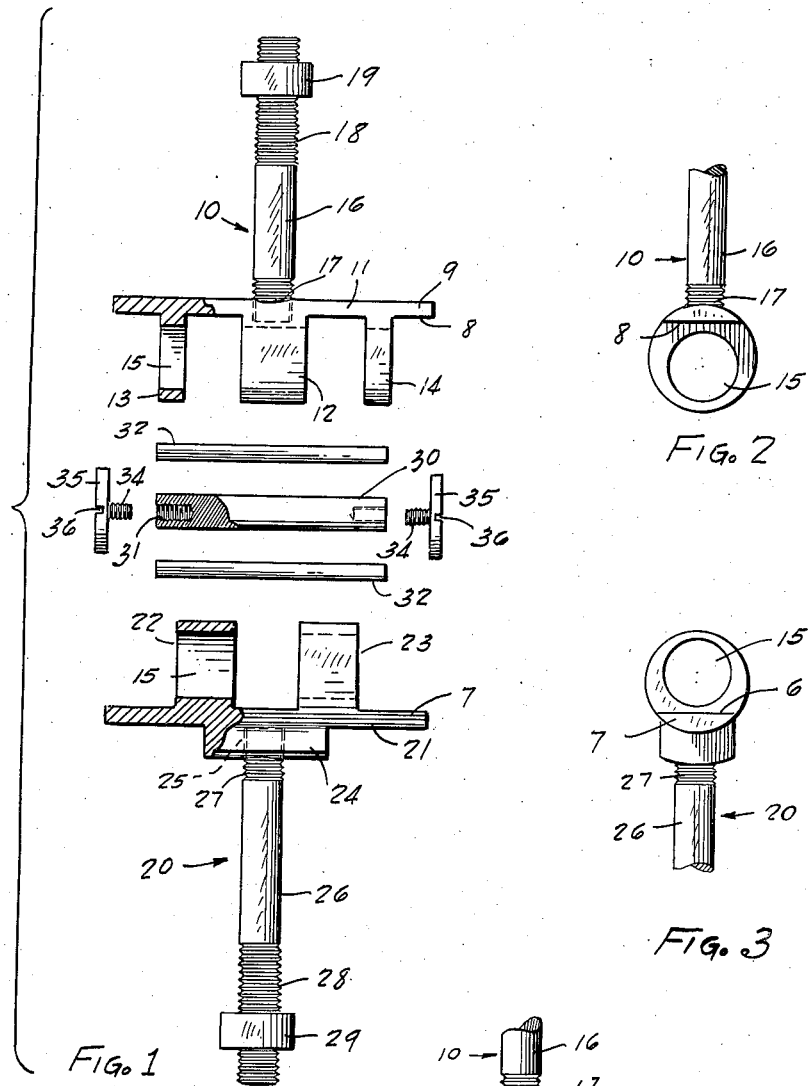
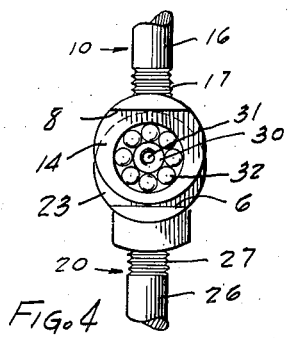
INVENTOR.
ARTHUR BOULTON.
BY Joshua R. H. Potts
ATTORNEY.

Patented Jan. 9, 1940

2,186,540

UNITED STATES PATENT OFFICE 2,186,540

ANKLE JOINT FOR ARTIFICIAL LIMBS

Arthur Boulton, Gwynedd Valley, Pa.

Application February 26, 1938, Serial No. 192,714

4 Claims. (Cl. 287—100)

This invention relates to joints such as are employed in the manufacture of artificial limbs and is concerned primarily with a joint intended to connect the foot piece to the shin section of an artificial limb.

The invention has in view, as its foremost objective, the provision of a novel joint of the pivotal type which includes anti-friction means for reducing wear and resistance to turning movement to a minimum. In carrying out this objective the invention contemplates the use of roller bearings as the anti-friction means, and in this connection another object is to provide an ankle joint of this character in which the roller bearing elements lend strength to the pivotal joint.

A further objective is the provision of an ankle joint which eliminates friction and wear between the foot piece and shin section of an artificial limb. This end is achieved by employing two joint members one of which is fixedly and immovably secured to the foot piece, while the other is similarly anchored to the shin section, any friction or rubbing incident to relative movement between the foot piece and shin section occurring between the joint members themselves.

In accordance with this invention two joint members are each formed with interfitting lugs having openings in alignment. Extending through the aligned openings in spaced relation to the walls thereof is a pivot pin, and surrounding this pivot pin are the roller bearing elements. Thus the strength of the hinged joint, which ordinarily would be determined by the pivot pin is increased by the roller bearing elements.

Another detailed object of the invention is the provision of highly simplified means for maintaining the roller bearing elements assembled about the pivot pin.

Under conditions of actual usage it is highly important in artificial limbs that the relative pivotal movement between the foot piece and shin section be properly limited, and a further more detailed object of the invention is the provision of an ankle joint of the character above described in which provision is made for limiting the relative pivotal movement in both directions.

Features and advantages of the invention associated with the attainment of this, as well as other objects above listed, will in part become apparent and in part be hereinafter stated, as the description of the invention proceeds.

The invention, therefore, comprises an ankle joint for artificial limbs that is made up of two joint members each being formed with projecting lugs that interfit with the corresponding lugs on the other member. The several lugs are formed with openings which are in alignment when the interfit is established, and extending through the aligned openings is a pivot pin that is surrounded by roller bearing elements. Associated with each end of the pivot pin are means for maintaining the assembled relationship.

For a full and more complete understanding of the invention reference may be had to the following description and accompanying drawing, wherein Figure 1 is a view partly in section and partly in elevation developing the several parts of the improved ankle joint in an exploded relationship, Figure 2 is an end elevational showing of one of the joint members, Figure 3 is an end elevational showing of the other joint member, and Figure 4 is an end elevational view of the joint when assembled.

Referring now to the drawing, wherein like reference characters denote corresponding parts, a joint member such as is intended to be anchored to the shin section of an artificial limb is referred to in its entirety by the reference character 10. This joint member 10 comprises a back piece 11 from which projects a central lug 12 and end lugs 13 and 14. Each of the lugs 12, 13 and 14 is formed with an opening, the several openings being in alignment and identified by the reference character 15.

The back piece 11 is defined by an arcuate wall 9 that conforms with the curvature of the lugs 12, 13 and 14 and a flat shoulder 8, as clearly brought out in Figure 2.

The latter figure also develops each of the lugs 12, 13 and 14 as of a circular formation, and the openings 15 are also circular. However, it has been found desirable to arrange the openings 15 eccentrically to the lugs so as to insure of stronger structural effects adjacent the back piece 11.

The relationship of the shoulder 8 to the eccentric openings 15 also becomes important in limiting relative movements between the parts, as will be hereinafter pointed out.

Extending upwardly from the back piece 11 is a shank 16 which may be secured thereto by the threaded connection shown at 17. This shank 16 is adapted to extend through an appropriate opening in the shin section of an artificial limb and at its upper end is threaded, as shown at 18. A nut 19 is screwed on the threaded section 18, and constitutes a means for effecting a firm anchorage with the shin section.

Thus any relative movement between the joint member 10 and the shin section to which it is anchored is positively precluded.

A second joint member referred to in its entirety by the reference character 20 is intended to be firmly secured to the foot piece of an artificial limb. This joint member 20 comprises a back piece 21 from which project lugs 22 and 23. These lugs 22 and 23 are, in a sense, complemental to the lugs 12, 13 and 14. That is, the lug 22 is designed to be snugly received in the space between the lugs 12 and 13, while the lug 23 is snugly received between the lugs 12 and 14, and conversely the central lug 12 is received between the lugs 22 and 23. These lugs 22 and 23 are also formed with openings 15 which align with the openings 15 in the lugs 12, 13 and 14, and, as shown in Figure 3, the openings 15 are arranged eccentrically in the lugs 22 and 23 in a manner corresponding to the arrangement in the other joint member 10.

As is the case with the back piece 11 in the joint member 10, the back piece 21 is defined by an arcuate wall 7 and a flat shoulder 6 that is formed in the space between the lugs.

The back piece 21 carries a boss 24 which is formed with a threaded socket 25. A shank 26 is threaded at one end as shown at 27, and this threaded end 27 is screwed into the socket 25. This shank 26 is adapted to pass through an appropriate opening in a foot piece, and at its lower end is threaded, as shown at 28. A nut 29 is carried on the threaded extremity 28 and constitutes a means for effecting a firm anchorage with the foot piece.

This firm anchorage between the joint member 20 and the foot piece is intended to positively prevent any relative movement between these parts. Thus all friction or rubbing incident to relative movement between the foot piece and shin section is taken up between the joint members 10 and 20.

A pivot pin is shown at 30 as of cylindrical formation and having a diameter considerably smaller than the openings 15. At each end the pivot pin 30 is formed with a threaded socket 31.

The pivot pin 30 extends through the aligned openings 15, and is substantially co-extensive with the lugs 12, 13, 14, 22 and 23 when the latter are in their interfitting assembled relationship. Disposed about the pivot pin 30 are a plurality of roller bearing elements 32, and the assembled relationship of the bearing elements 32 about the pivot pin 30 in the openings 15 is maintained by a retaining device at each end of the pivot pin 30. Each of these retaining devices takes the form of a screw member 34 having a head 35 of disk-like formation and sufficiently large to overlap the edges of the openings 15 and the end lugs 13 and 14. Each of these heads 35 may be formed with a tool engaging socket 36 to provide for the screw stems 34 being tightly screwed into the sockets 31.

With the several parts assembled in the manner above described the pivot pin and the several roller bearing elements 32 extend throughout the aligned openings 15, whereby the strength of the pivot joint which ordinarily would be dependent on the pivot pin 30 alone is supplemented by the several roller bearing elements 32. Thus any likelihood of the pivot pin shearing off as a result of the strains and stresses created incident to use is minimized.

When the above described joint is used in an artificial limb there is, in effect, a downward pressure on the shank 16 and an opposite upward pressure on the shank 26. While the pivot pin 30 and rollers 32 while assembled as a unit form a compact structure, there is no engagement under pressure of all the rollers 32 with the entire circumferential surfaces of the openings 15.

Considering the openings 15 of the lugs 12, 13 and 14 independently of the lugs 22 and 23 and bearing in mind the effective downward pressure of the shank 16 it is evident that there is an engagement of the surfaces defining the opening 15 with the rollers 32, that is under maximum pressure at the top, with the pressure of engagement diminishing to nothing or no engagement at the bottom.

Similarly upward pressure on the shank 26 causes engagement under maximum pressure of the rollers 32 at the bottom with the openings 15 of lugs 22 and 23, and which pressure gradually diminishes to nothing or no engagement at the top.

With no engagement or conditions of engagement under no pressure there is, of course, no friction created.

Referring now to Figure 4, and assuming that the shanks 16 and 26 are moved relative to one another so that the movement of the shank 16 is clockwise, while relative movement of the shank 26 is counter-clockwise, only the uppermost rollers 32 will be affected by engagement with the surfaces of the openings 15 of the lugs 12, 13 and 14, while only the lowermost lugs are effectively engaged by the surfaces of the openings 15 of lugs 22 and 23. Thus friction which ordinarily would be created as an incident to the pivotal movement is materially reduced.

When the joint members 10 and 20 are assembled the shanks 16 and 26 are in alignment, when the joint is in a so-called neutral or intermediate position, this relationship being depicted in Figure 4. A certain amount of relative movement in either direction from the neutral position is permitted, but this movement is limited due to the presence of the shoulders 6 and 8, and the fact that the openings 15 are eccentric to the circular lugs. Thus as the lugs 12, 13 and 14 are turned relative to the lugs 22 and 23, the exterior circular walls of the latter will come closer and finally engage with the shoulder 8, and in the same manner the exterior circular walls of the lugs 12, 13 and 14 will approach and finally engage the shoulder 6, thus preventing further relative turning.

While a preferred specific embodiment of the invention is hereinbefore set forth it is to be clearly understood that I am not to be limited to the exact construction illustrated and described, because various modifications of these details may be provided in putting the invention into practice within the purview of the appended claims.

I claim:

1. An ankle joint for artificial limbs comprising a pair of joint members, one being adapted to be anchored to the shin section of an artificial limb, while the other is adapted to be anchored to the foot piece of the artificial limb, interfitting lugs carried by said joint members and formed with aligned openings, a pivot pin extending through said aligned openings, said pivot pin having a diametrical dimension less than the diameter of said aligned openings to provide a space about the pivot pin, roller bearing elements in said space, said roller bearing elements and pivot pin being substantially co-extensive with said lugs, and means maintaining the pivot pin and roller bearing elements assembled in said aligned openings.

2. An ankle joint for artificial limbs comprising a pair of joint members, one being adapted to be anchored to the shin section of an artificial limb, while the other is adapted to be anchored to the foot piece of the artificial limb, each of said joint members being formed with a back piece, a lug projecting from the back piece of one member, and a lug projecting from the back piece of the other member, said lugs being formed with aligned openings, a pivot pin extending through said aligned openings, roller bearing elements disposed in said aligned openings about said pivot pin, and a headed screw threaded into each end of said pivot pin for maintaining the roller bearing elements and pivot pin assembled in the aligned openings.

3. An ankle joint for artificial limbs comprising a pair of joint members, one being adapted to be anchored to the shin section of an artificial limb, while the other is adapted to be anchored to the foot piece of the artificial limb, spaced lugs extending from the back piece of one joint member and spaced lugs extending from the back piece of the other joint member, the lugs on the said joint members interfitting and being formed with aligned openings, and a roller bearing assembly in said aligned openings and co-extensive therewith.

4. An ankle joint for artificial limbs comprising a pair of joint members, one being adapted to be anchored to the shin section of an artificial limb, while the other is adapted to be anchored to the foot piece of the artificial limb, spaced lugs extending from the back piece of one joint member and spaced lugs extending from the back piece of the other joint member, the lugs on the said joint members interfitting and being formed with aligned openings, said openings being eccentric to the respective lugs in which they are formed, flat shoulders formed on the back pieces in the spaces between the lugs, and a roller bearing assembly including a pivot pin in said aligned openings, said shoulders cooperating with the eccentricity of the aligned openings to provide stops for limiting relative movement of the joint members.

ARTHUR BOULTON.